(12) United States Patent
Schulmeyer et al.

(10) Patent No.: US 9,166,402 B2
(45) Date of Patent: Oct. 20, 2015

(54) ELECTROSTATIC DISCHARGE PROTECTION APPARATUS

(71) Applicant: TEXAS INSTRUMENTS INCORPORATED, Dallas, TX (US)

(72) Inventors: Kyle Clifton Schulmeyer, Dallas, TX (US); Cynthia Ann Torres, Austin, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 121 days.

(21) Appl. No.: 13/741,341

(22) Filed: Jan. 14, 2013

(65) Prior Publication Data

US 2014/0198415 A1    Jul. 17, 2014

(51) Int. Cl.
*H02H 9/04*    (2006.01)

(52) U.S. Cl.
CPC .................................... *H02H 9/046* (2013.01)

(58) Field of Classification Search
CPC   H01L 27/0266; H01L 27/0285; H02H 9/041; H02H 9/046
USPC .......................................... 361/56, 91.1, 111
See application file for complete search history.

(56) References Cited

U.S. PATENT DOCUMENTS

| | | | |
|---|---|---|---|
| 5,946,177 A | 8/1999 | Miller et al. | |
| 6,690,555 B1 * | 2/2004 | Pasqualini | 361/56 |
| 7,027,275 B2 * | 4/2006 | Smith | 361/56 |
| 7,102,862 B1 * | 9/2006 | Lien et al. | 361/56 |
| 7,545,614 B2 * | 6/2009 | Traynor et al. | 361/56 |
| 8,493,700 B2 * | 7/2013 | Hsihe et al. | 361/56 |
| 8,514,532 B2 * | 8/2013 | Worley et al. | 361/56 |
| 8,576,526 B2 * | 11/2013 | Chu et al. | 361/56 |
| 8,643,987 B2 * | 2/2014 | Chu et al. | 361/56 |
| 8,737,028 B2 * | 5/2014 | Di Sarro et al. | 361/56 |
| 2007/0053120 A1 * | 3/2007 | Gauthier et al. | 361/56 |
| 2007/0053467 A1 * | 3/2007 | Forbes | 375/329 |
| 2007/0109697 A1 * | 5/2007 | Huh | 361/56 |
| 2007/0109698 A1 * | 5/2007 | Kim | 361/56 |
| 2008/0007882 A1 * | 1/2008 | Bernard et al. | 361/56 |
| 2009/0201615 A1 * | 8/2009 | Bernard et al. | 361/56 |
| 2010/0149701 A1 * | 6/2010 | Drapkin et al. | 361/56 |
| 2010/0290165 A1 * | 11/2010 | Hartberger | 361/56 |
| 2010/0296212 A1 * | 11/2010 | Liang et al. | 361/56 |
| 2013/0163131 A1 * | 6/2013 | Gist et al. | 361/56 |

* cited by examiner

*Primary Examiner* — Stephen W Jackson
*Assistant Examiner* — Christopher Clark
(74) *Attorney, Agent, or Firm* — John R. Pessetto; Frank D. Cimino (57) ABSTRACT

ESD protection apparatus disclosed herein include an ESD trigger circuit to sense the occurrence of an ESD event and an ESD discharge device to provide a low impedance path to ground through which to discharge energy associated with the ESD pulse. Some embodiments also include a VDD turn-on clamp to prevent the ESD discharge device from switching to a conductive state during a VDD power-on event. Some embodiments further include a VDD glitch clamp to prevent a switching pulse triggered by a transient disruption in the VDD supply from propagating to the ESD discharge device and causing the ESD discharge device to conduct in the absence of an ESD event.

17 Claims, 7 Drawing Sheets

ELECTROSTATIC DISCHARGE PROTECTION APPARATUS

TECHNICAL FIELD

Structures described herein relate to semiconductor integrated circuits, including apparatus to protect such circuits from electrostatic discharge (ESD).

BACKGROUND INFORMATION

Semiconductor integrated circuits utilizing high impedance transistor technologies such as metal oxide semiconductor (MOS) technologies are known to be vulnerable to ESD. ESD "events" may include the so-called "human body model" (HBM) type of event. See e.g., JEDEC Standard JS-001-2012, JOINT JEDEC/ESDA STANDARD FOR ELECTROSTATIC DISCHARGE SENSITIVITY TEST—HUMAN BODY MODEL (HBM)—COMPONENT LEVEL (2012) for additional information about HBM. A person may accumulate static electrical charge on the surface of his or her body, generally through the rubbing together of dissimilar articles of clothing, shoes rubbing against carpet, clothing rubbing against a car seat when entering or exiting a vehicle, etc., particularly at times of low relative humidity. An HBM ESD event occurs when the person subsequently touches a conductor, including perhaps an electronic circuit and discharges the accumulated charge to and through circuit components. Such components may be subject to damage by a resulting discharge pulse of 1000 volts or more with a discharge time of several hundred nanoseconds.

ESD protection devices utilizing a metal oxide semiconductor field-effect transistor (MOSFET) as a discharge device between voltage rails are known. A MOSFET designed for such purpose typically includes a wide, short current channel able to conduct several amperes of current produced by a typical ESD event. Existing ESD protection devices may be subject to false triggering during power supply startup and/or as a consequence of power supply glitches during operation.

SUMMARY OF THE INVENTION

ESD protection apparatus disclosed herein include an ESD trigger circuit to sense the occurrence of an ESD pulse and an ESD discharge device to provide a low impedance path to ground through which to discharge energy associated with the ESD pulse. Some embodiments also include a VDD turn-on clamp to prevent the ESD discharge device from switching to a conductive state during a VDD power-on event. Some embodiments further include a VDD glitch clamp to prevent a switching pulse triggered by a transient disruption in the VDD supply from propagating to the ESD discharge device and causing the ESD discharge device to conduct. Power supply energy is conserved and extended battery use times may result.

DETAILED DESCRIPTION

Figure 1:
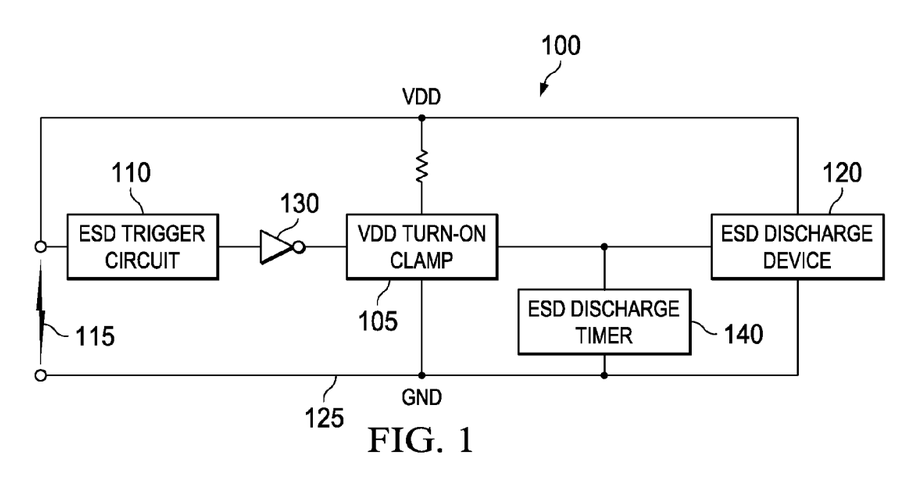
FIG. 1 is a block diagram of an ESD-triggered protection apparatus including a VDD turn-on clamp according to various embodiments of the invention.

FIG. 1 is a block diagram of an ESD-triggered protection apparatus 100 including a VDD turn-on clamp 105 according to various embodiments of the invention. The ESD-triggered protection apparatus 100 includes an ESD trigger circuit 110. The ESD trigger circuit 110 senses an ESD pulse 115 and generate a switching pulse responsive to the ESD pulse 115. The switching pulse cascades through the protection apparatus 100 as further described below.

The ESD protection apparatus 100 also includes an ESD discharge device 120 communicatively coupled to the ESD trigger circuit 110. The ESD discharge device 120 operates in response to the switching pulse to transfer a current generated by the ESD pulse 115 to a ground rail 125. The protection apparatus 100 also includes one or more inverting buffers 130 communicatively coupled between the ESD trigger circuit 110 and the ESD discharge device 120. The inverting buffers 130 propagate the switching pulse from the ESD trigger circuit 110 to the ESD discharge device 120.

The ESD protection apparatus 100 further includes an ESD discharge timer 140 communicatively coupled to the ESD discharge device 120. The ESD discharge timer 140 determines a conduction period associated with the ESD discharge device 120.

The ESD protection apparatus 100 also includes VDD turn-on clamp 105 coupled to the ESD discharge device 120. The VDD turn-on clamp 105 prevents the ESD discharge device 120 from switching to a conduction state during a VDD power-on event and in the absence of an ESD pulse.

Figure 2:
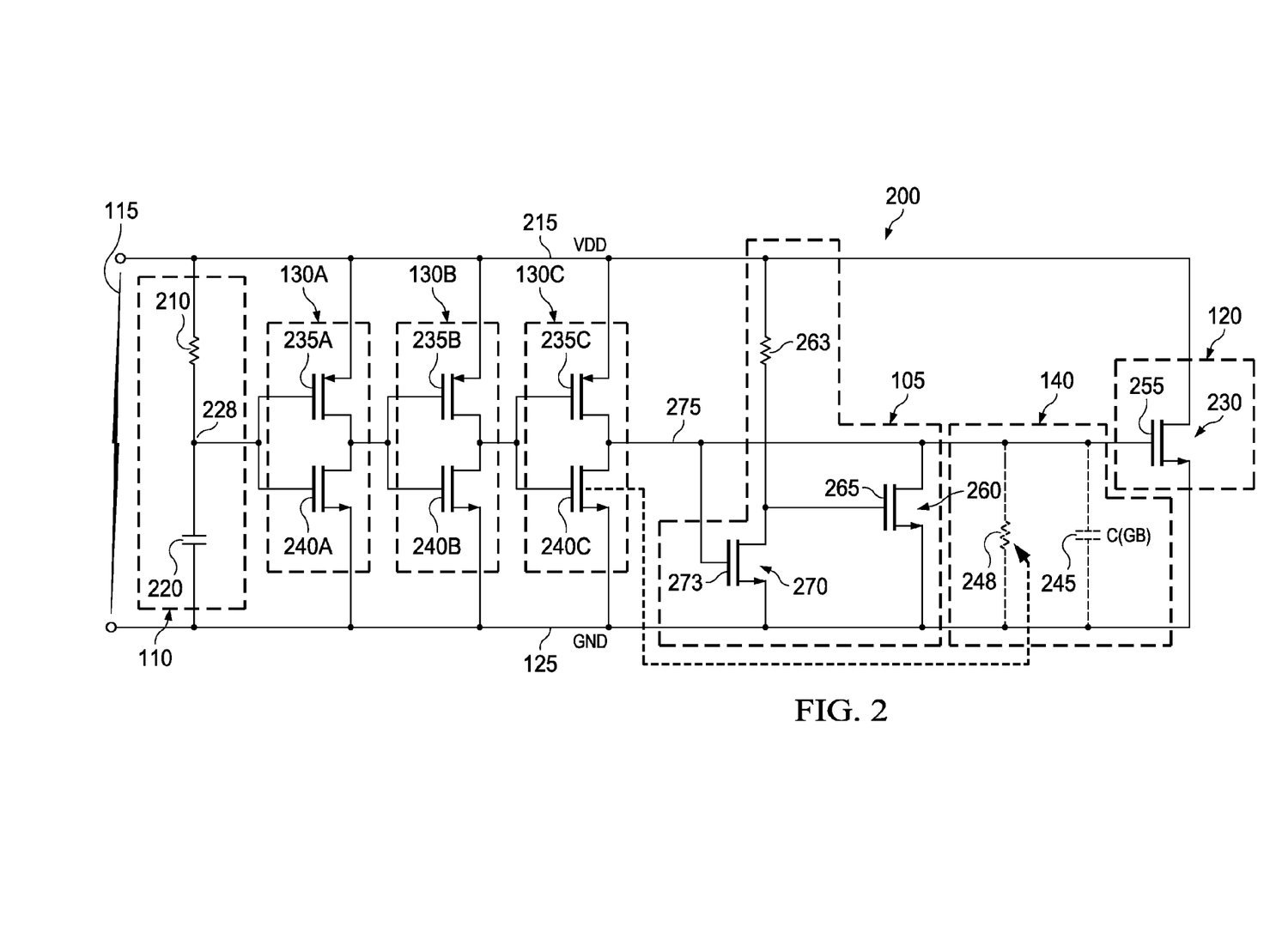
FIG. 2 is a circuit diagram of an ESD protection apparatus including a VDD turn-on clamp according to various example embodiments.

FIG. 2 is a circuit diagram of an ESD protection apparatus 200 including a VDD turn-on clamp 105 according to various example embodiments. In some embodiments, an ESD trigger circuit 110 includes a trigger circuit resistor 210 coupled to a VDD voltage rail 215. The trigger circuit 110 may also include a trigger circuit capacitor 220 in series with the trigger circuit resistor 210 to a ground rail 125. A switching pulse originates at a junction 228 of the trigger circuit resistor 210 and the trigger circuit capacitor 220 in response to the ESD pulse 115, as previously mentioned.

A time constant associated with the ESD trigger circuit 110 is selected to be long (e.g., approximately 50 ns) relative to the fast rising edge of the ESD pulse 115 (e.g., on the order of several hundred picoseconds). However, the time constant of the trigger circuit 110 is short relative to the entire width of the ESD pulse 115 (e.g., approximately 500 ns). As such, the ESD trigger circuit 110 is designed to initiate a switching cascade through the protection apparatus 200 in order to cause the ESD discharge device 120 to begin dissipating energy associated with the ESD pulse 115. However, in some embodiments, latching of the ESD discharge device 120 for the duration of the ESD pulse 115 is performed by a discharge timer circuit 140.

In some embodiments, the ESD discharge device 120 may include a power MOSFET transistor 230 having a conduction channel with a width sufficient to transfer the current generated by the ESD pulse 115 to ground rail 125. Although reference may be made in this disclosure to the power MOSFET transistor 230 as the ESD discharge device 120, it is noted that other implementations of the ESD discharge device 120 are contemplated herein.

In some embodiments, the ESD protection apparatus 200 also includes first, second, and third inverting buffers 130A, 130B, and 130C, respectively. In some implementations, each inverting buffer 130 includes a PMOS transistor (e.g., PMOS transistors 235A, 235B, and 235C) coupled to the VDD voltage rail 215. In such implementations, each inverting buffer 130 also includes an NMOS transistor (e.g., NMOS transistors 240A, 240B, and 240C) coupled to ground rail 125. It is noted that NMOS transistor 240C associated with the third inverter 130C may be fabricated with a long, narrow-width channel to provide resistance characteristics as further described below. It is also noted that some embodiments may include additional or fewer inverting buffers and that each inverting buffer may be structured with additional or fewer transistors and/or other components.

The occurrence of an ESD event resulting in an ESD pulse 115 causes a large initial voltage drop across trigger circuit resistor 210. The voltage drop across trigger circuit resistor 210 forward biases PMOS transistor 235A, resulting in a positive pulse at the output of the first inverter 130A. The output of the first inverter 130A in turn forward biases NMOS transistor 240B of the second inverter 130B, resulting in a negative pulse at the output of the second inverter 130B. The latter negative pulse in turn forward biases PMOS inverter transistor 235C. Transistor 235C consequently conducts and forward biases power MOSFET transistor 230. Power MOSFET transistor 230 opens a low resistance, high current capacity channel through which to discharge the energy produced by the ESD pulse 115.

The ESD protection apparatus 200 also includes an ESD discharge timer 140, as previously mentioned. The ESD discharge timer 140 includes a discharge timer capacitor 245 coupled between a gate 255 of the power MOSFET transistor 230 and the ground rail 125. In some embodiments, a gate-to-body capacitance internal of the power MOSFET transistor 230 may be utilized as the discharge timer capacitor 245. The ESD discharge timer 140 also includes a discharge timer resistor 248 coupled between the gate 255 of the power MOSFET transistor 230 and the ground rail 125. In some embodiments, inverting buffer transistor 240C may be formed with a long, narrow conduction channel to operate as the discharge timer resistor 248.

The discharge timer 140 is charged by the switching pulse which cascades through the inverting buffers to the gate 255 of the power MOSFET transistor 230. The discharge timer 140 subsequently maintains a positive bias on the gate 255 of the power MOSFET transistor 230 after the switching pulse has dissipated. The discharge timer capacitor 245 and resistor 248 are selected to obtain a time constant of sufficient length such that energy associated with the ESD pulse 115 is substantially dissipated as current flow through the power MOSFET transistor 230 to the ground rail 125.

The ESD protection apparatus 200 includes a VDD turn-on clamp 105, as previously mentioned. The VDD turn-on clamp 105 includes a VDD turn-on clamp transistor 260. The VDD turn-on clamp transistor 260 is current channel coupled between the gate 255 of the power MOSFET transistor 230 and the ground rail 125. A VDD pull-up resistor 263 is coupled between the VDD voltage rail 215 and a gate 265 of the VDD turn-on clamp transistor 260. The pull up resistor 263 biases the VDD turn-on clamp transistor 260 to a conductive state at VDD power-on.

Clamping the gate 255 of the power MOSFET transistor 230 to the ground rail 125 prevents conduction of the power MOSFET transistor 230 at times other than the occurrence of an ESD event. The VDD turn-on clamp 105 also includes a clamp release transistor 270. The current channel of the clamp release transistor 270 is coupled between the gate 265 of the VDD turn-on clamp transistor 260 and the ground rail 125. The gate 273 of the clamp release transistor 270 is coupled to the switching pulse path 275 leading to the gate 255 of the power MOSFET transistor 230. A switching pulse traversing the switching pulse path 275 causes the clamp release transistor 270 to conduct and to reverse bias the gate 265 of the VDD turn-on clamp transistor 260. Consequently, conduction of the VDD turn-on clamp transistor 260 ceases, allowing the switching pulse to reach the gate 255 of the power MOSFET transistor 230.

Figure 3:
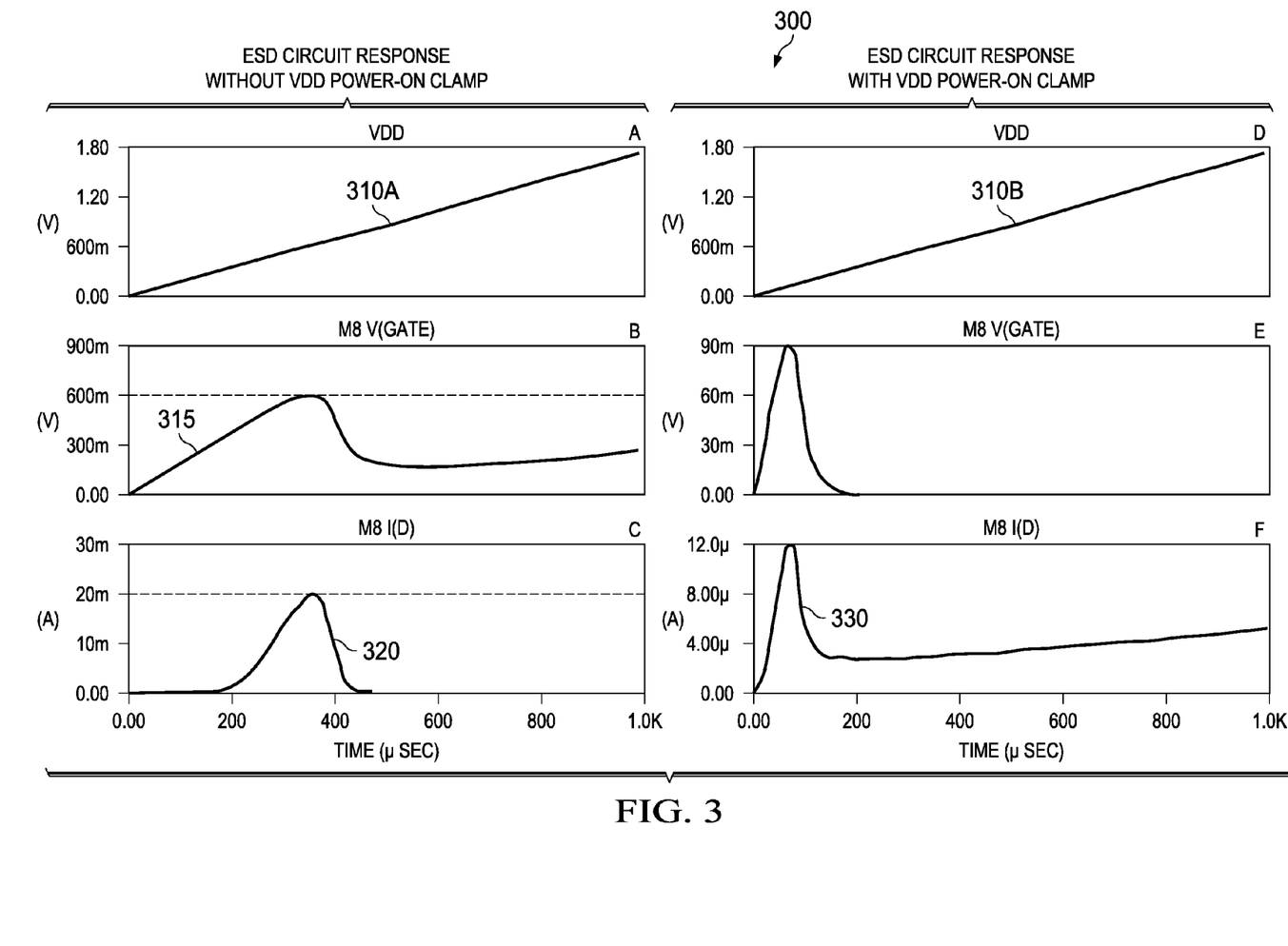
FIG. 3 is a series of plots associated with an ESD protection apparatus showing improvement in spurious current conducted through an ESD discharge device during a power-on event according to various example embodiments.

FIG. 3 is a series of plots 300 associated with the ESD protection apparatus 200 showing improvement in spurious current conducted through the ESD discharge device 120 during a power-on event according to various example embodiments. Plots 3A, 3B, and 3C reflect circuit response of the ESD protection apparatus 200 in the absence of the VDD turn-on clamp 105. Plots 3D, 3E, and 3F reflect circuit response of the ESD protection apparatus 200 with the VDD turn-on clamp 105 operational.

Plots 3A and 3D show the same linear ramp-up 310A and 310B, respectively, of VDD over the course of approximately 1 millisecond following VDD power-on. Absent the VDD turn-on clamp 105, plot 3B shows a voltage ramp 315 to approximately 600 mV at the gate 255 of the power MOSFET 230. The voltage ramp 315 is due primarily to current leakage through the inverting buffer transistor 235C and the subsequent voltage developed across the discharge timer resistor 248. This forward bias on the gate 255 of the power MOSFET 230 results in a pulse of current 320 through the power MOSFET 230 of approximately 20 milliamps.

With the VDD turn-on clamp 105 enabled, plot 3E shows that the voltage at the gate 255 of the power MOSFET 230 reaches only approximately 90 mV before the gate 255 is clamped by the VDD turn-on clamp transistor 260. Consequently, the resulting spurious current traversing the power MOSFET 230 is limited to approximately 12 microamps, as shown by curve 330.

Figure 4:
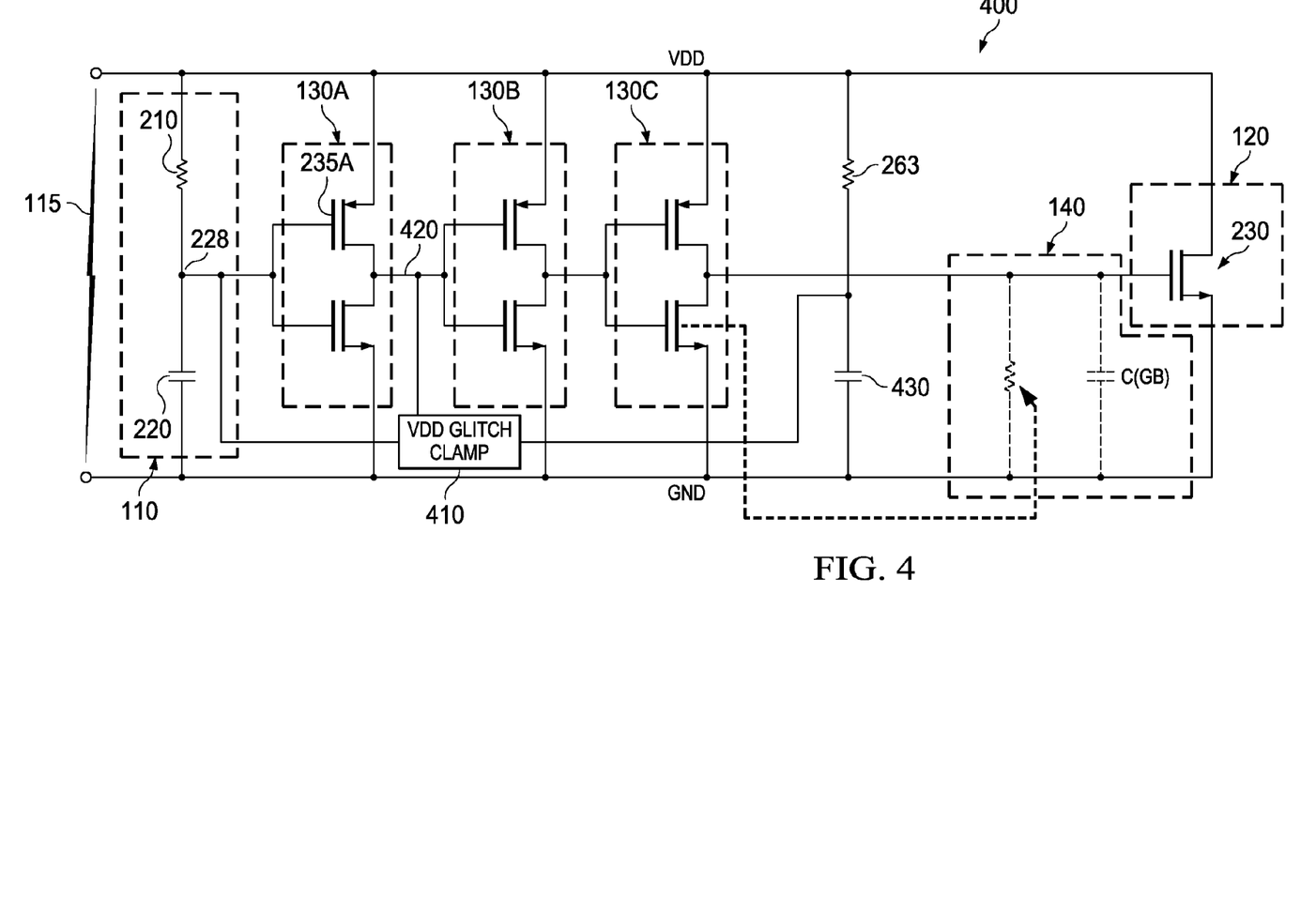
FIG. 4 is a block diagram of an ESD protection apparatus including a VDD glitch clamp according to various example embodiments.

FIG. 4 is a block diagram of an ESD protection apparatus 400 including a VDD glitch clamp 410 according to various example embodiments. The ESD protection apparatus 400 also includes an ESD trigger circuit 110, inverting buffers 130A, 130B, and 130C, ESD discharge device 120, and ESD discharge timer 140 as previously described in detail above.

The VDD glitch clamp 410 is communicatively coupled to the output 420 of the first inverting buffer 130A. The VDD glitch clamp 410 holds the output 420 low in the absence of an ESD pulse 115. A low state at the output 420 prevents the propagation of false triggers resulting from transient disruptions in the VDD supply during operation of the ESD protection apparatus 400. Such false triggers may occur when a fast rise-time positive-going VDD waveform is restored, rapidly re-charging trigger capacitor 220 through trigger resistor 210 and causing inverting buffer transistor 235A to become forward biased and to conduct. The resulting switching pulse, if allowed to propagate through the inverting buffers 130A, 130B, and 130C and to the ESD discharge device 120, would cause the power MOSFET 230 to conduct.

The VDD glitch clamp 410 is also communicatively coupled to the ESD trigger circuit 110 at node 228 and to a glitch clamp RC circuit including a pull-up resistor 263 and a VDD glitch clamp capacitor 430. Time constants associated with the ESD trigger circuit 110 and the glitch clamp RC circuit act upon inputs to the VDD glitch clamp 410 to maintain the low state of the output 420 of the inverting buffer 130A in the case of a transient power supply disruption.

Figure 5:
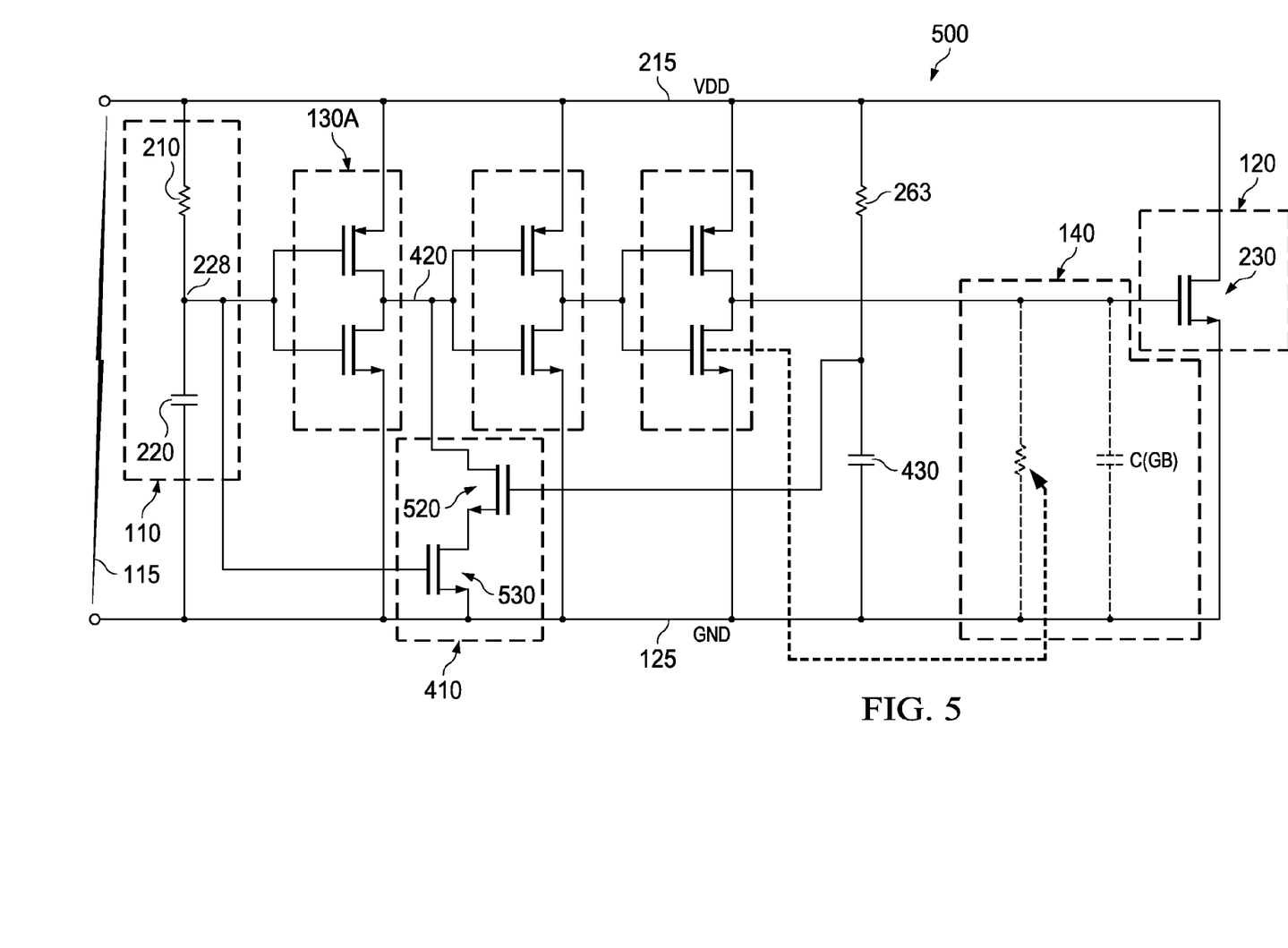
FIG. 5 is a circuit diagram of an ESD protection device including a VDD glitch clamp according to various example embodiments.

FIG. 5 is a circuit diagram of an ESD protection device 500 including the VDD glitch clamp 410 according to various example embodiments. In some embodiments, the VDD glitch clamp 410 includes a first VDD glitch clamp transistor 520. A current channel of the first VDD glitch clamp transistor 520 is communicatively coupled to the output 420 of the inverting buffer 130A, a path traversed by switching pulses generated at the trigger circuit 110. The VDD glitch clamp 410 may also include a second VDD glitch clamp transistor 530. A conduction channel of the second VDD glitch clamp transistor 530 is coupled in series between the conduction channel of the first VDD glitch clamp transistor and ground rail 125.

In some embodiments, the VDD glitch clamp 410 also includes a pull-up resistor 263 coupled between the VDD voltage rail 215 and a gate of the first VDD glitch clamp transistor 520. The VDD glitch clamp 410 further includes a VDD glitch clamp capacitor 430 coupled between the gate of the first VDD glitch clamp transistor 520 and the ground rail 125. The VDD glitch clamp capacitor 430 maintains the first VDD glitch clamp transistor 520 in a conductive state during a transient power supply disruption.

A capacitor 220 associated with the ESD trigger circuit 110 is communicatively coupled to a gate of the second VDD glitch clamp transistor 530 at node 228. The capacitor 220 maintains the second VDD glitch clamp transistor 530 in a conductive state during a transient power supply disruption. The first and second VDD glitch clamp transistors 520 and 530 clamp the path 420 to the ground rail 125 to avoid traversal by a VDD transient-induced switching pulse and propagation of the pulse to the ESD discharge device 120. Conduction by the power MOSFET 230 is thus prevented and supply power is conserved.

Figure 6:
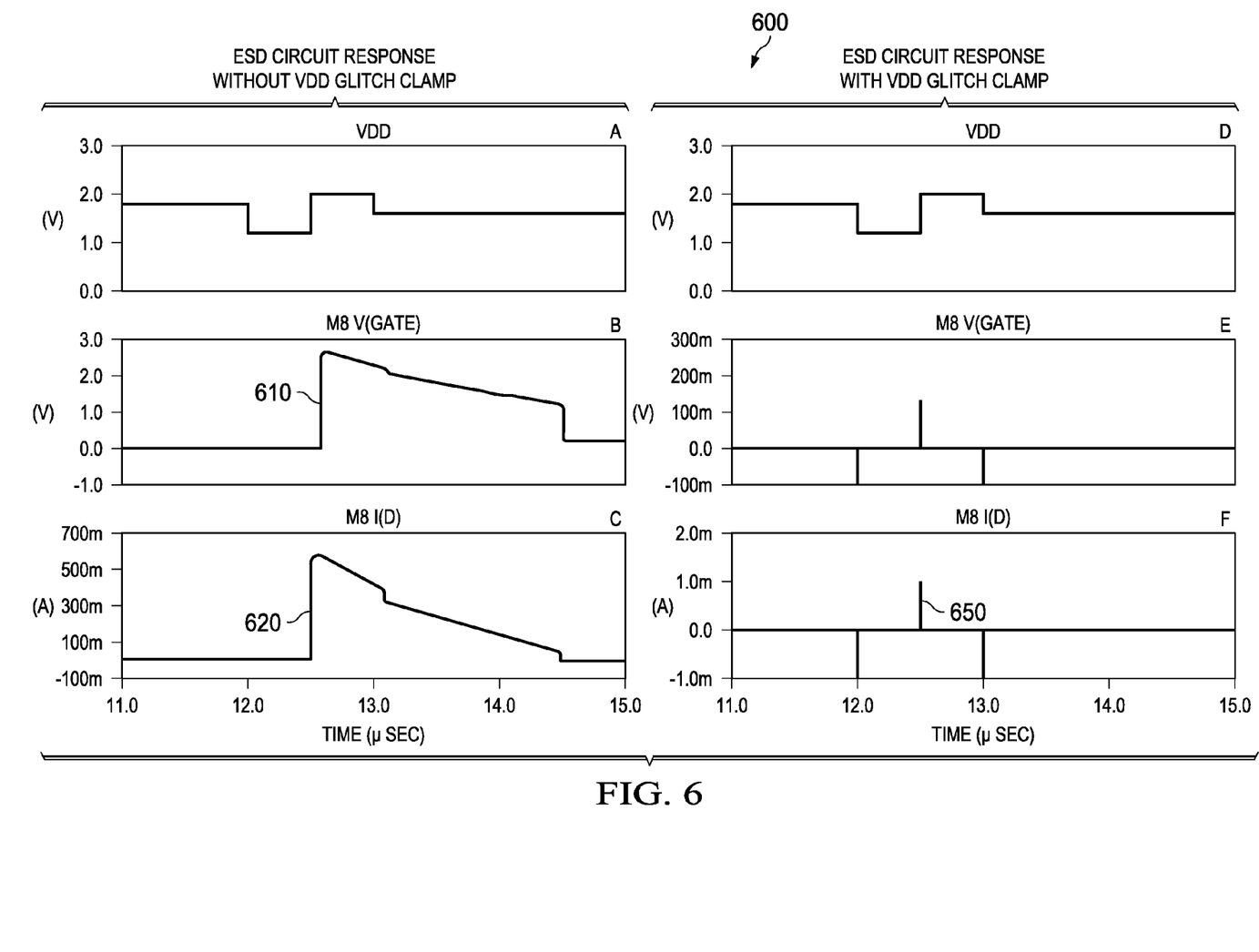
FIG. 6 is a series of plots associated with an ESD protection apparatus showing improvement in spurious current conducted through an ESD discharge device in the presence of power supply glitches according to various example embodiments.

FIG. 6 is a series of plots 600 associated with the ESD protection apparatus 500, showing improvement in spurious current conducted through the ESD discharge device 120 in the presence of power supply glitches according to various example embodiments.

Plots 6A, 6B, and 6C reflect circuit responses of the ESD protection apparatus 500 in the absence of the VDD glitch clamp 410. Plots 6D, 6E, and 6F reflect circuit responses of the ESD protection apparatus 500 with the VDD glitch clamp 410 operational.

Plots 6A and 6D show the same sub-microsecond loss and subsequent recovery of VDD with overshoot. Absent the VDD glitch clamp 410, plot 6B shows a voltage pulse 610 rising to approximately 2.5 volts at the gate 255 of the power MOSFET 230. This forward bias on the gate 255 of the power MOSFET 230 results in a pulse of current 620 through the power MOSFET 230 of approximately 600 milliamps peak amplitude.

With the VDD glitch clamp 410 enabled, plot 6E shows that the voltage at the gate 255 of the power MOSFET 230 reaches only approximately 105 mV for a few nanoseconds in response to a positive-going VDD transition. This result obtains because the path for 20 to the gate 255 is already pre-clamped by the VDD glitch clamp 410. Consequently, the resulting spurious current is limited to approximately 1 milliamp spikes 650 of very short duration.

Figure 7:
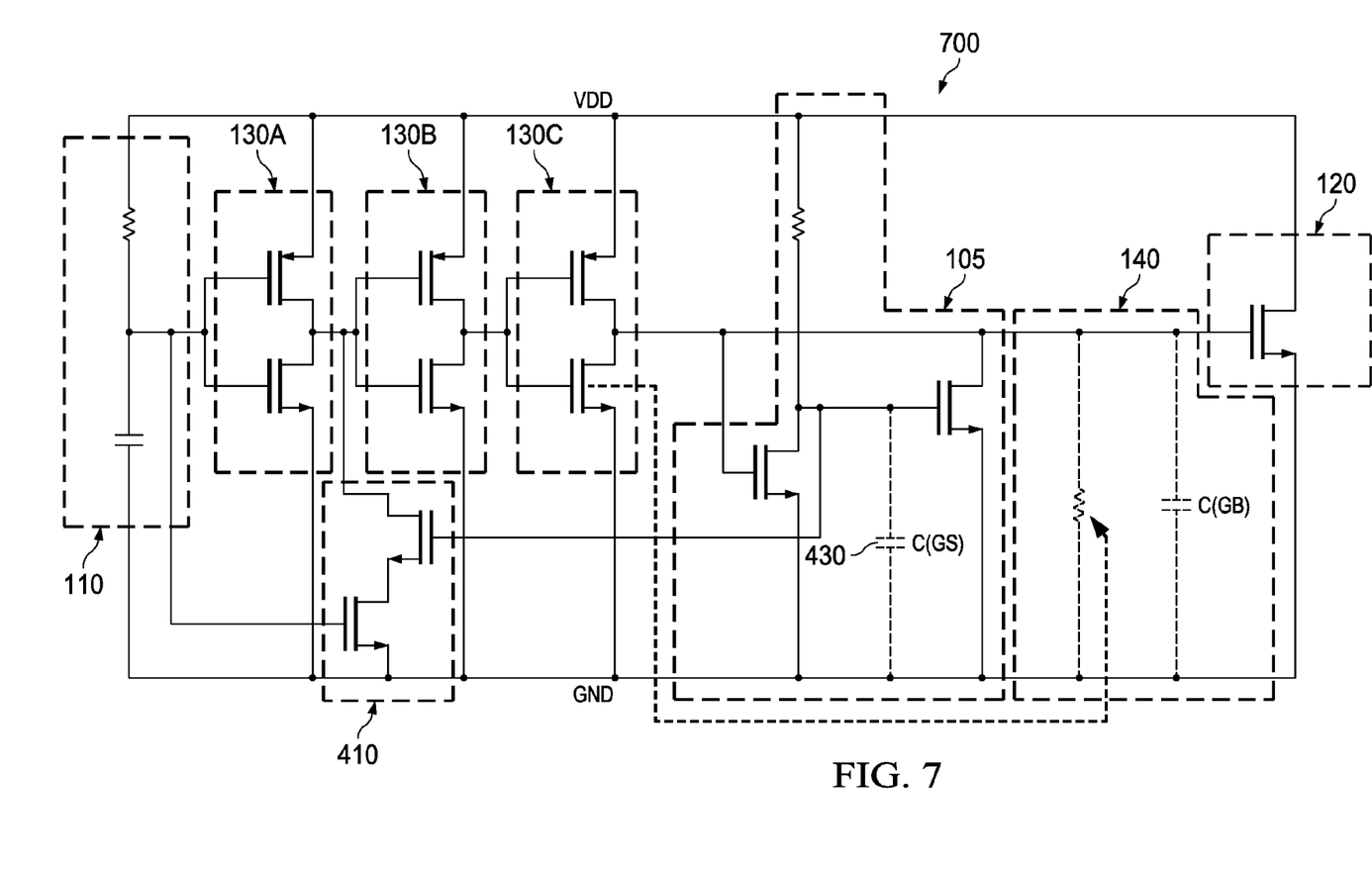
FIG. 7 is a circuit diagram of an ESD protection device including both a VDD turn-on clamp and a VDD glitch clamp according to various example embodiments.

FIG. 7 is a circuit diagram of an ESD protection device 700 including both a VDD turn-on clamp 105 and a VDD glitch clamp 410 according to various example embodiments. The ESD protection apparatus 700 also includes an ESD trigger circuit 110, inverting buffers 130A, 130B, and 130C, ESD discharge device 120, and ESD discharge timer 140 as previously described in detail above.

It is noted that, in some embodiments of the ESD protection device 700, the VDD glitch clamp capacitor 430 of FIG. 5 may be implemented using a parasitic gate-to-source capacitance associated with the VDD turn-on clamp transistor 260.

Apparatus described herein may be useful in applications other than an ESD protection apparatus. Examples of the ESD protection apparatus 100, 200, 400, 500, and 700 are intended to provide a general understanding of the structures of various embodiments. They are not intended to serve as complete descriptions of all elements and features of apparatus and systems that might make use of these structures.

The various embodiments may be incorporated into semiconductor analog and digital circuits for use in receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

Apparatus disclosed herein sense ESD events and trigger an ESD discharge device to conduct electrical current associated with an ESD pulse to a power supply ground rail. A VDD turn-on clamp holds the ESD discharge device in a non-conductive state while the VDD supply ramps up and in the absence of an ESD-triggered switching pulse. A VDD glitch clamp utilizes RC time constants to prevent a switching pulse triggered by a transient disruption in the VDD supply from propagating to the ESD discharge device and causing conduction of the power MOSFET. Power supply energy is conserved and extended battery use times may result.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. An electrostatic discharge (ESD)-triggered protection apparatus, comprising:
    an ESD trigger circuit to sense an ESD pulse and to generate a switching pulse responsive to the ESD pulse;
    an ESD discharge device communicatively coupled to the ESD trigger circuit and responsive to the switching pulse to transfer a current generated by the ESD pulse to ground, the ESD discharge device comprising a MOS power transistor; and
    a VDD turn-on clamp communicatively coupled to the ESD discharge device to prevent the ESD discharge device from switching to a conduction state during a VDD power-on event the VDD turn-on clamp further comprising:
        a VDD turn-on clamp transistor to prevent conduction of the MOS power transistor at times other than the occurrence of an ESD event, a current channel of the VDD turn-on clamp transistor coupled between a gate of the MOS power transistor and ground;
        a pull-up resistor coupled between the VDD voltage rail and a gate of the VDD turn-on clamp transistor to bias the VDD turn-on clamp transistor to a conductive state at VDD power-on; and
        a clamp release transistor to disable the VDD turn-on clamp transistor upon the occurrence of an ESD event, a current channel of the clamp release transistor coupled between the gate of the VDD turn-on clamp transistor and ground, a gate of the clamp release transistor coupled to the gate of the MOS power transistor to drive the clamp release transistor to conduction at an occurrence of an ESD event.

2. The ESD-triggered protection apparatus of claim 1, further comprising:
    an ESD discharge timer communicatively coupled to the ESD discharge device to determine a conduction period associated with the ESD discharge device.

3. The ESD-triggered protection apparatus of claim 2, the ESD discharge timer further comprising:
    a gate-to-body capacitance of the MOS power transistor; and
    a timer resistor coupled between a gate of the MOS power transistor and ground, a resistance value of the timer resistor selected to obtain a time constant sufficient to substantially discharge energy associated with the ESD pulse as current flow through the MOS power transistor to ground.

4. The ESD-triggered protection apparatus of claim 3, the timer resistor implemented as a long, narrow conduction channel associated with an inverting buffer transistor.

5. The ESD-triggered protection apparatus of claim 1, further comprising:
    at least one inverting buffer communicatively coupled between the ESD trigger circuit and the ESD discharge device to propagate the switching pulse from the ESD trigger circuit to the ESD discharge device.

6. The ESD-triggered protection apparatus of claim 5, the at least one inverting buffer further comprising:
    first, second, and third inverters, each inverter comprising a PMOS transistor coupled to a VDD voltage rail and an NMOS transistor coupled to ground, the NMOS transistor associated with the third inverter having a long, narrow-width channel to provide resistance characteristics.

7. The ESD-triggered protection apparatus of claim 1, the ESD trigger circuit further comprising:
    a trigger circuit resistor coupled to a VDD voltage rail; and
    a trigger circuit capacitor in series with the trigger circuit resistor to a ground rail, the switching pulse to originate at a junction of the trigger circuit resistor and the trigger circuit capacitor responsive to the ESD pulse.

8. The ESD-triggered protection apparatus of claim 1, wherein
    the metal oxide semiconductor (MOS) power transistor has a current channel with a width sufficient to transfer the current generated by the ESD pulse to ground.

9. An electrostatic discharge (ESD)-triggered protection apparatus, comprising:
    an ESD trigger circuit to sense an ESD pulse and to generate a switching pulse responsive to the ESD pulse;
    an ESD discharge device communicatively coupled to the ESD trigger circuit and responsive to the switching pulse to transfer a current generated by the ESD pulse to ground; and
    a VDD glitch clamp communicatively coupled to the ESD trigger circuit to prevent a VDD transmit-induced switching pulse from propagating to the ESD discharge device and causing the ESD discharge device to conduct, the VDD glitch clamp further comprising:
        a first VDD glitch clamp transistor, a current channel of the first VDD glitch clamp transistor communicatively coupled to a path traversed by the switching pulse;
        a second VDD glitch clamp transistor, a current channel of the second VDD glitch clamp transistor coupled in series between the current channel of the first VDD glitch clamp transistor and a ground rail, the first and second VDD glitch clamp transistors to clamp the path traversed by the switching pulse to ground absent an ESD pulse occurrence;
        a pull-up resistor coupled between a VDD voltage rail and a gate of the first VDD glitch clamp transistor;
        a VDD glitch clamp capacitor coupled between the gate of the first VDD glitch clamp transistor and the ground rail to maintain the first VDD glitch clamp transistor in a conductive state during a transient power supply disruption; and
        a capacitor associated with the ESD trigger circuit communicatively coupled to a gate of the second VDD glitch clamp transistor to maintain the second VDD glitch clamp transistor in a conductive state during the transient power supply disruption.

10. The ESD-triggered protection apparatus of claim 9, further comprising:
an ESD discharge timer communicatively coupled to the ESD discharge device to determine a conduction period associated with the ESD discharge device.

11. The ESD-triggered protection apparatus of claim 9, further including:
at least one inverting buffer communicatively coupled between the ESD trigger circuit and the ESD discharge device to propagate the switching pulse from the ESD trigger circuit to the ESD discharge device.

12. An electrostatic discharge (ESD)-triggered protection apparatus, comprising:
an ESD trigger circuit to sense an ESD pulse and to generate a switching pulse responsive to the ESD pulse;
an ESD discharge device communicatively coupled to the ESD trigger circuit and responsive to the switching pulse to transfer a current generated by the ESD pulse to ground;
at least one inverting buffer communicatively coupled between the ESD trigger circuit and the ESD discharge device to propagate the switching pulse from the ESD trigger circuit to the ESD discharge device;
an ESD discharge timer communicatively coupled to the ESD discharge device to determine a conduction period associated with the ESD discharge device;
a VDD turn-on clamp communicatively coupled to the ESD discharge device to prevent the ESD discharge device from switching to a conduction state during a VDD power-on event;
a VDD glitch clamp communicatively coupled to the ESD trigger circuit to prevent a VDD transmit-induced switching pulse from propagating to the ESD discharge device and causing the ESD discharge device to conduct, the VDD glitch clamp further comprising:
a first VDD glitch clamp transistor, a current channel of the first VDD glitch clamp transistor communicatively coupled to a path traversed by the switching pulse;
a second VDD glitch clamp transistor, a current channel of the second VDD glitch clamp transistor coupled in series between the current channel of the first VDD glitch clamp transistor and ground, the first and second VDD glitch clamp transistors to clamp the path traversed by the switching pulse to ground absent an ESD pulse occurrence;
a pull-up resistor coupled between a VDD voltage rail and a gate of the first VDD glitch clamp transistor;
a VDD glitch clamp capacitor coupled between the gate of the first VDD glitch clamp transistor and the ground rail to maintain the first VDD glitch clamp transistor in a conductive state during a transient power supply disruption; and
a capacitor associated with the ESD trigger circuit communicatively coupled to a gate of the second VDD glitch clamp transistor to maintain the second VDD glitch clamp transistor in a conductive state during a transient power supply disruption.

13. The ESD-triggered protection apparatus of claim 12, the VDD glitch clamp capacitor comprising a gate-to-source internal capacitance associated with the VDD turn-on clamp transistor.

14. The ESD-triggered protection apparatus of claim 12, the ESD trigger circuit further comprising:
a trigger circuit resistor coupled to a VDD voltage rail; and
a trigger circuit capacitor in series with the trigger circuit resistor to a ground rail, the switching pulse to originate at a junction of the trigger circuit resistor and the trigger circuit capacitor responsive to the ESD pulse.

15. The ESD-triggered protection apparatus of claim 12, the ESD discharge device further comprising:
a metal oxide semiconductor (MOS) power transistor having a current channel of width sufficient to transfer the current generated by the ESD pulse to ground.

16. The ESD-triggered protection apparatus of claim 12, the ESD discharge timer further comprising:
a gate-to-body capacitance of a MOS power transistor; and
a timer resistor coupled between a gate of the MOS power transistor and ground, a resistance value of the timer resistor selected to obtain a time constant sufficient to substantially discharge energy associated with the ESD pulse as current flow through the MOS power transistor to ground.

17. The ESD-triggered protection apparatus of claim 12, the VDD turn-on clamp further comprising:
a VDD turn-on clamp transistor to prevent conduction of a MOS power transistor of the ESD discharge device at times other than the occurrence of an ESD event, a current channel of the VDD turn-on clamp transistor coupled between a gate of the MOS power transistor and ground;
the pull-up resistor coupled between the VDD voltage rail and a gate of the VDD turn-on clamp transistor to bias the VDD turn-on clamp transistor to a conductive state at VDD power-on; and
a clamp release transistor to disable the VDD turn-on clamp transistor upon the occurrence of an ESD event, a current channel of the clamp release transistor coupled between the gate of the VDD turn-on clamp transistor and ground, a gate of the clamp release transistor coupled to the gate of the MOS power transistor to drive the clamp release transistor to conduction at an occurrence of an ESD event.

* * * * *